(12) United States Patent
Mizuta et al.

(10) Patent No.: US 9,359,663 B2
(45) Date of Patent: Jun. 7, 2016

(54) MANUFACTURING METHOD FOR HOT PRESS FORMED STEEL MEMBER

(71) Applicant: KOBE STEEL, LTD., Kobe (JP)

(72) Inventors: Naoki Mizuta, Kakogawa (JP); Tatsuya Asai, Kakogawa (JP); Takayuki Yamano, Kakogawa (JP); Tetsuji Hoshika, Kakogawa (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 14/655,565

(22) PCT Filed: Jan. 17, 2014

(86) PCT No.: PCT/JP2014/050833
§ 371 (c)(1),
(2) Date: Jun. 25, 2015

(87) PCT Pub. No.: WO2014/112594
PCT Pub. Date: Jul. 24, 2014

(65) Prior Publication Data
US 2015/0354035 A1 Dec. 10, 2015

(30) Foreign Application Priority Data
Jan. 18, 2013 (JP) .................................. 2013-007808

(51) Int. Cl.
*C21D 8/00* (2006.01)
*C22C 38/38* (2006.01)
(Continued)

(52) U.S. Cl.
CPC ............. *C22C 38/38* (2013.01); *B21D 22/022* (2013.01); *B21D 22/208* (2013.01); *B21D 53/88* (2013.01);
(Continued)

(58) Field of Classification Search
CPC ........ C21D 8/005; C21D 6/001; C21D 6/002; C21D 6/005; C21D 6/008; B21D 22/022
See application file for complete search history.

(56) References Cited

U.S. PATENT DOCUMENTS

| 2004/0047757 A1 | 3/2004 | Takayama |
| 2011/0226393 A1* | 9/2011 | Senuma ............ C21D 1/185 148/645 |

(Continued)

FOREIGN PATENT DOCUMENTS

| JP | 2002-282951 A | 10/2002 |
| JP | 2005-152969 A | 6/2005 |

(Continued)

OTHER PUBLICATIONS

International Search Report and Written Opinion issued Apr. 22, 2014 in PCT/JP2014/050833 filed Jan. 17, 2014.

*Primary Examiner* — Rebecca Lee
(74) *Attorney, Agent, or Firm* — Oblon, McClelland, Maier & Neustadt, L.L.P.

(57) ABSTRACT

Provided is a method for manufacturing a hot press formed steel member that has high strengths, an excellent balance between strength and ductility, and good deformation properties upon crush on collision (crashworthiness). The manufacturing method is highly efficient and allows a high degree of freedom with respect to the shape to be formed. The method manufactures a steel member by heating a steel sheet having a specific chemical composition and subjecting the steel sheet to at least one time of hot press forming. In the method, the heating temperature is equal to or higher than the $Ac_3$ transformation temperature, and a starting temperature of the hot press forming is in the range from the heating temperature to martensite start (Ms) temperature. Cooling from [(Ms temperature)−150° C.] down to 80° C. is performed so that a tempering parameter ($\lambda$) specified by Expression (1) is in the range from 7100 to 8030.

6 Claims, 10 Drawing Sheets

(51) Int. Cl.

| | | |
|---|---|---|
| *B21D 22/02* | (2006.01) | |
| *C21D 6/00* | (2006.01) | |
| *C22C 38/28* | (2006.01) | |
| *C22C 38/04* | (2006.01) | |
| *C22C 38/00* | (2006.01) | |
| *B21D 53/88* | (2006.01) | |
| *C22C 38/14* | (2006.01) | |
| *C22C 38/58* | (2006.01) | |
| *B21D 22/20* | (2006.01) | |
| *C21D 1/673* | (2006.01) | |
| *B32B 15/01* | (2006.01) | |
| *C22C 38/02* | (2006.01) | |
| *C22C 38/06* | (2006.01) | |
| *C22C 38/08* | (2006.01) | |
| *C22C 38/12* | (2006.01) | |
| *C22C 38/16* | (2006.01) | |
| *C22C 38/32* | (2006.01) | |

(52) U.S. Cl.
CPC ............. *B32B 15/013* (2013.01); *C21D 1/673* (2013.01); *C21D 6/001* (2013.01); *C21D 6/002* (2013.01); *C21D 6/005* (2013.01); *C21D 6/008* (2013.01); *C21D 8/005* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/28* (2013.01); *C22C 38/32* (2013.01); *C22C 38/58* (2013.01); *C21D 2211/008* (2013.01)

(56) References Cited

U.S. PATENT DOCUMENTS

| 2011/0252856 A1 | 10/2011 | Matsuda et al. |
| 2014/0144560 A1 | 5/2014 | Yamano et al. |

FOREIGN PATENT DOCUMENTS

| JP | 2005-288528 A | 10/2005 |
| JP | 2007-270293 A | 10/2007 |
| JP | 2009-082992 A | 4/2009 |
| JP | 2010-126770 A | 6/2010 |
| JP | 2010-215958 A | 9/2010 |
| JP | 2011-218436 A | 11/2011 |
| JP | 2012-237040 A | 12/2012 |

\* cited by examiner

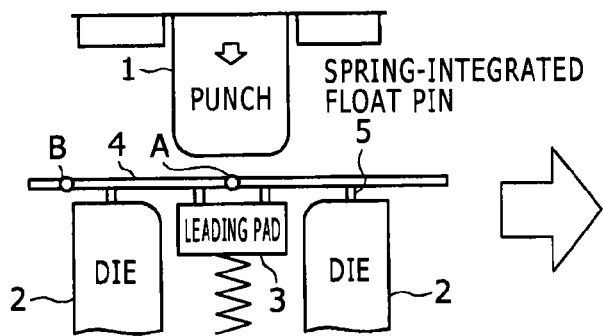
FIG.1A
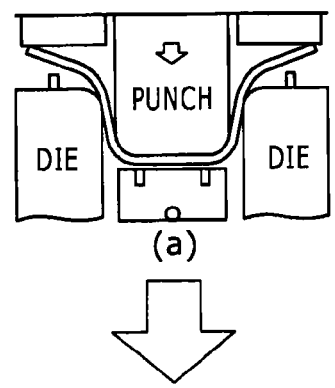
FIG.1B
FIG.1C
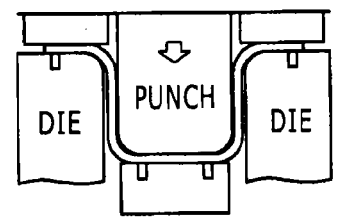
FIG.2A
INITIALLY FORM (DRAW, BEND) INTO ROUGH SHAPE
FIG.2B
SECONDLY PERFORM ADDITIONAL WORKING, SUCH AS REDRAWING OR RESTRIKING, INTO TARGET SHAPE
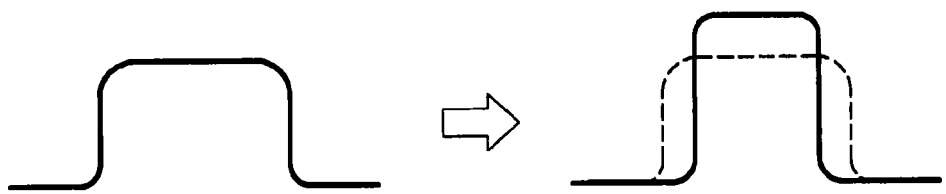

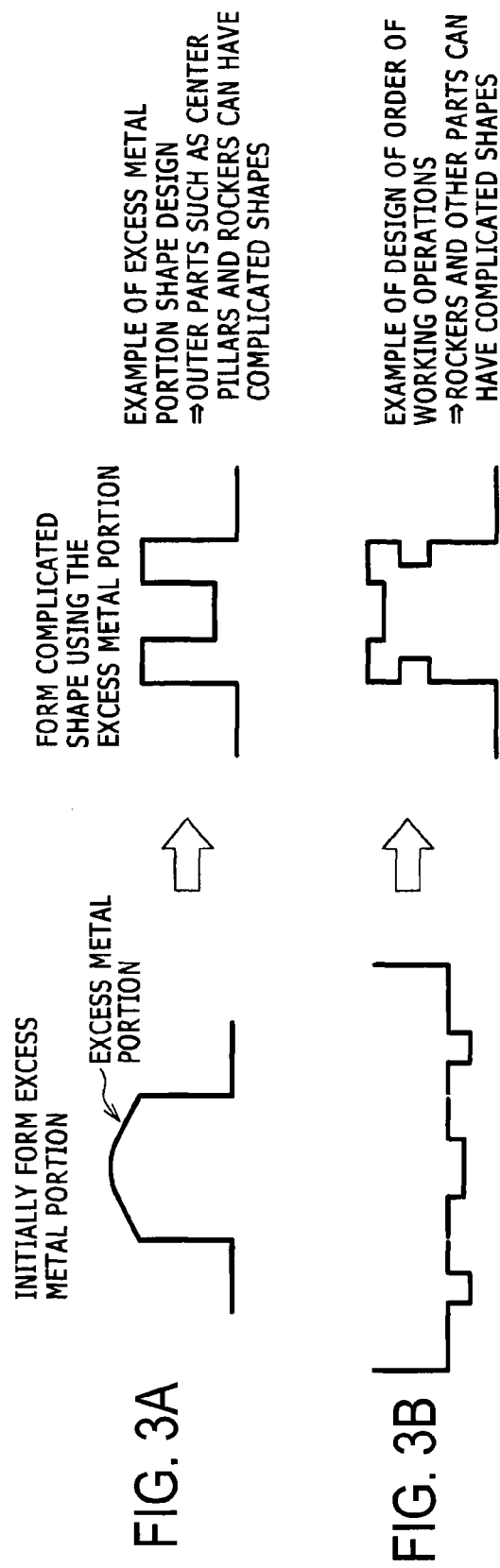

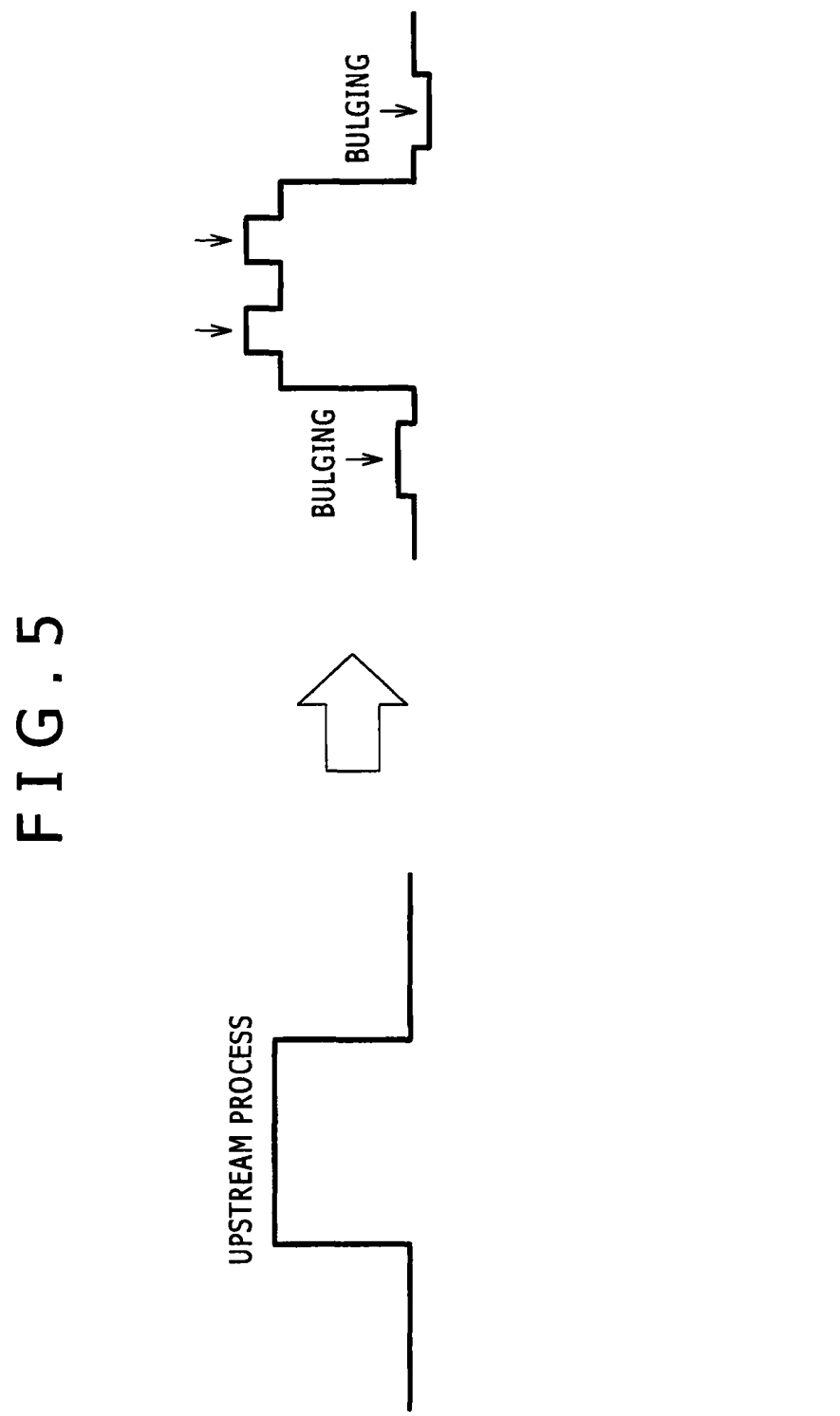

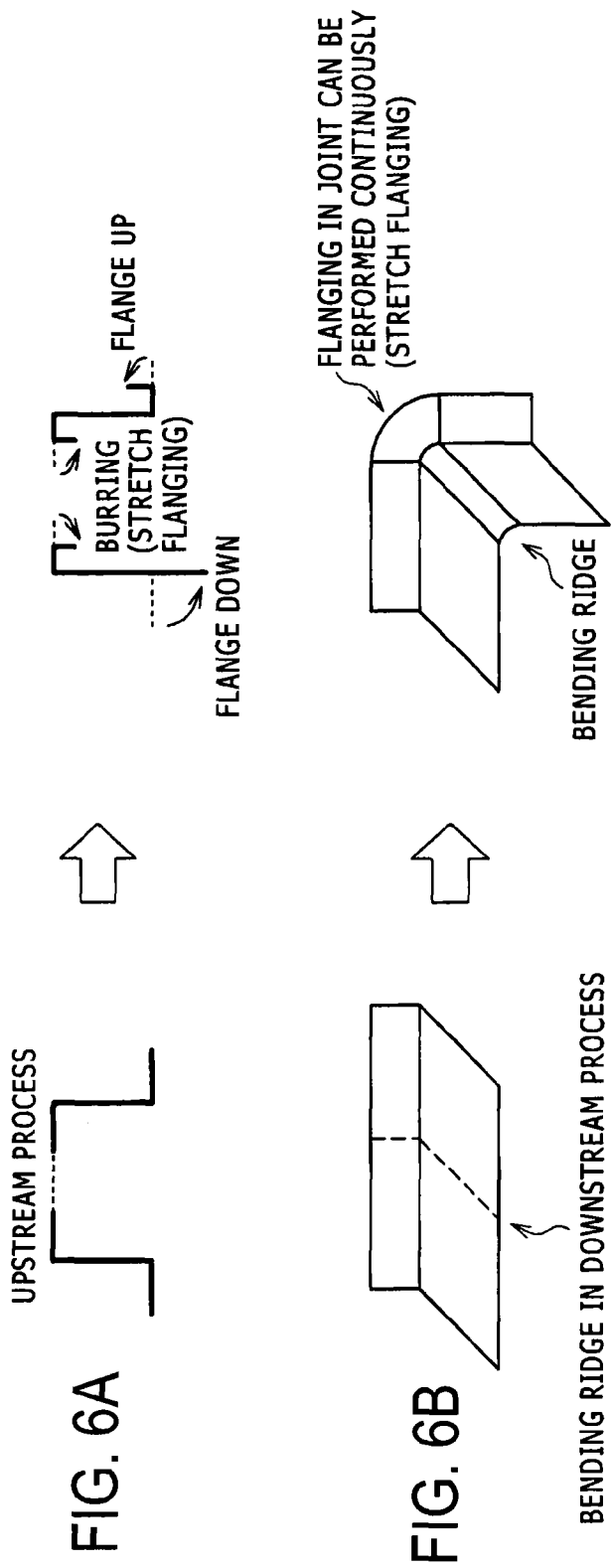

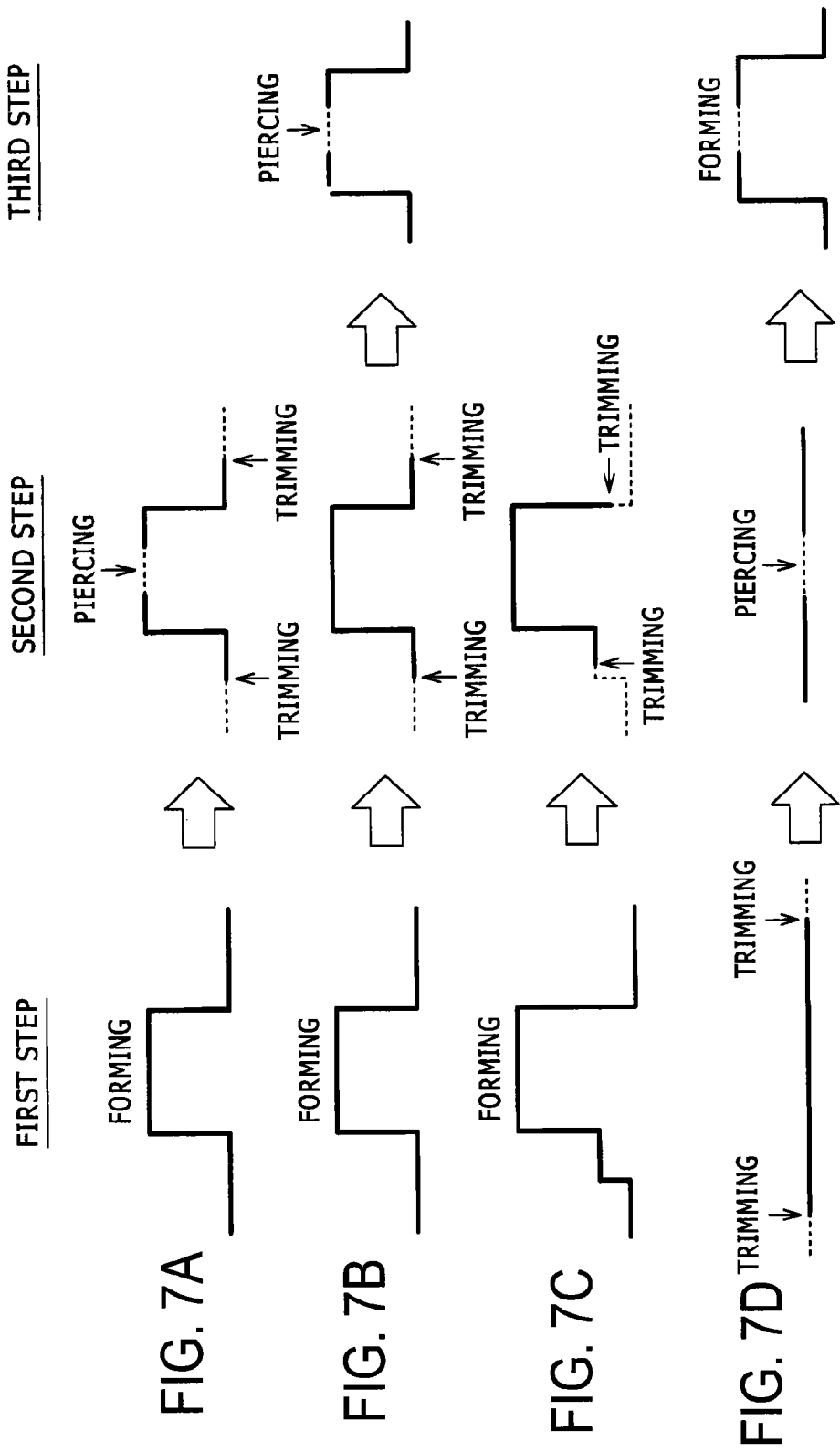

TENSILE TEST SPECIMEN SAMPLING POSITION

MANUFACTURING METHOD FOR HOT PRESS FORMED STEEL MEMBER

TECHNICAL FIELD

The present invention relates to methods for manufacturing hot press formed steel members. Specifically, the present invention relates to a method for manufacturing a hot press formed steel member that has high strengths and excellent balance between strength and ductility (strength-ductility balance).

BACKGROUND ART

Materials for steel automotive parts are designed to have higher strengths so as to achieve both crashworthiness and reduction in weight. Independently, the parts upon manufacturing require good workability of material steel sheets. Assume that such high-strength steel sheets, in particular steel sheets having a tensile strength of 980 MPa or more, are subjected to cold working (e.g., cold press forming). Disadvantageously, however, this requires a higher press forming load or causes remarkably low dimensional accuracy.

As a possible solution to the disadvantage, there is a hot press forming technique. The hot press forming is also called hot pressing or hot stamping. In the hot press forming, a material steel sheet is subjected to press forming while being heated so as to perform forming and achieve higher strengths simultaneously. In this technique, the steel sheet at a high temperature (e.g., in the austenite single phase region) is formed or shaped with tools (punch and die), held and cooled at the (forming) bottom dead center to extract heat from the steel sheet to the tools to thereby rapidly cool the steel sheet. Thus, the material steel sheet is quenched. The forming technique, when performed, can give a formed product having good dimensional accuracy and high strengths. The technique can be performed with a lower forming load as compared with cold forming of parts having strengths at a similar same level.

However, the technique requires holding at the bottom dead center for ten and several seconds so as to extract heat into the tools; and during this period, forming of another part is impossible. Unfortunately, one steel member therefore occupies the pressing machine for a long time, and this results in poor productivity.

In addition, the hot press forming requires cooling at a cooling rate of 30° C./second or more. Thus, forming as well as transfer has to be performed within a short time of ten and several seconds; the press forming can be performed approximately only once; and there is a limit to the shape capable of forming by one press forming. Disadvantageously, the technique therefore fails to manufacture parts having complicated shapes. Further disadvantageously, the resulting steel member obtained after the working has high strengths and poor ductility, is not expected to have high shock absorption upon collision, and is limited in uses to which the steel member is applicable.

To solve these disadvantages, investigations have been made to improve the productivity and/or to improve the degree of freedom of forming in hot press forming techniques.

Typically, Patent Literature (PTL) 1 discloses that the productivity could be improved by holding a workpiece at the bottom dead center for a shorter time, separating the workpiece from the tools at a higher temperature, and subjecting the workpiece to a subsequent step. This technique, however, requires rapid cooling (at a rate of 150° C./s in working examples) after forming, thereby requires a special facility design, and is probably poorly versatile, although the technique provides a shorter holding time in the tools. In addition, the manufacturing method specified in PTL 1 performs forming for a short time of ten and several seconds as in conventional techniques, is difficult to perform multistage press forming, and fails to process the workpiece into a complicated shape.

PTL 2 discloses a hot press forming method. In this method, cooling water is injected from tools during press forming so as to shorten the holding time at the bottom dead center and to achieve both high strengths and satisfactory productivity. The method, however, requires complicated production facilities to inject the cooling water from the tools and is not versatile.

PTL 3 to 5 each proposes hot press forming methods. In the method disclosed in PTL 3, a steel sheet heated to 1000° C. or lower is subjected to multistage press forming of two to five stages (steps) in a temperature range of 600° C. or higher and then cooled at a cooling rate of 10° C./second or more. In the multistage press forming, press forming per stage is performed within 3 seconds, and a subsequent press forming is performed within 4 seconds. In the method disclosed in PTL 4, a steel sheet is heated to a temperature range from the $Ac_3$ temperature to the melting point, is partially supported by a punch provided in tools, is subjected to forming at a start temperature higher than a temperature at which all of ferrite, pearlite, bainite, and martensite transformations occur, and is rapidly cooled after the forming. In the method disclosed in PTL 5, press forming is performed so that a formed product is released from press forming tools within 5 seconds after the press forming tools reach the bottom dead center and cooled at a cooling rate of 30° C./s or more so as to allow the formed part to have a hardness HV of 400 or more.

However, further improvements such as adjustment of chemical compositions are probably required so as to surely provide excellent strength-ductility balance.

CITATION LIST

Patent Literature

PTL 1: Japanese Unexamined Patent Application Publication (JP-A) No. 2011-218436
PTL 2: JP-A No. 2002-282951
PTL 3: JP-A No. 2005-152969
PTL 4: JP-A No. 2009-82992
PTL 5: JP-A No. 2005-288528

SUMMARY OF INVENTION

Technical Problem

The present invention has been made under these circumstances, and an object of the present invention is to establish and provide a technique for manufacturing a steel member by hot press forming inexpensively and efficiently with high degree of freedom in the shape to be formed, where the steel member has high strengths and excellent strength-ductility balance and offers good deformation properties (crashworthiness) upon collision collapse.

As used herein the term "high strengths" in the steel member according to the present invention refers to having a yield strength of 800 MPa or more (preferably 850 MPa or more, and more preferably 900 MPa or more) and a tensile strength of 980 MPa or more (preferably 1270 MPa or more, and more preferably 1470 MPa or more). The yield strength and tensile strength herein are determined by methods described in after-mentioned experimental examples. Also as used herein the term "excellent strength-ductility balance" in the steel member according to the present invention refers to that the steel member has a product (TS×EL) of tensile strength TS and elongation EL of 13550 MPa·% or more (preferably 13600 MPa·% or more, more preferably 13700 MPa·% or more, furthermore preferably 13800 MPa·% or more, and particularly preferably 14000 MPa·% or more), where the product TS×EL is determined by a method described in the experimental examples.

Solution to Problem

The present invention achieves the object and provides a method for manufacturing a hot press formed steel member. The method includes heating a steel sheet and subjecting the steel sheet to at least one time of hot press forming. The steel sheet contains, as a chemical composition in mass percent (hereinafter the same for chemical composition), C in a content of 0.15% to 0.4%;
Si in a content of greater than 1.0% to 1.65%;
Al in a content of 0.5% or less (excluding 0%);
Mn in a content of 1% to 3.5%;
Ti in a content of 0.10% or less (excluding 0%); and
B in a content of 0.005% or less (excluding 0%), with the remainder being iron and inevitable impurities. In the method, a temperature (heating temperature) for the heating is equal to or higher than $Ac_3$ transformation temperature. A starting temperature of the hot press forming is in a range from the heating temperature to martensite start (Ms) temperature. Cooling from [(Ms temperature)—150° C.] down to 80° C. is performed so that a tempering parameter ($\lambda$) as specified by Expression (1) is in a range from 7100 to 8030. Expression (1) is expressed as follows:

[Math. 1]

$$\lambda = 293 \times \left\{ \log\left( \frac{\sum_{n=1}^{5000} t'_n}{3600} \right) + 20 \right\} - 430 \times [Si] \quad (1)$$

where $\lambda$ represents the tempering parameter; [Si] represents the content (in mass percent) of Si in the steel; and $t_n'$ is a value as specified by Expression (2):

[Math. 2]

$$t'_n = 3600 \times 10^{\wedge}\left\{ \frac{T_{n-1} + 273}{293} \times \left( \log\frac{t_n - t_{n-1}}{3600} + 20 \right) - 20 \right\} \quad (2)$$

where $t_n$ represents an "n-th" time (in second) when a total cooling time from [(Ms temperature)–150° C.] down to 80° C. is divided into 5000 equal parts; $T_n$ represents a temperature (° C.) at the n-th time $t_n$, where $t_0$ is 0 second, and $T_0$ is [(Ms temperature)–150° C.]; and 10^{ } represents the { }-th power of 10.

The cooling from [(Ms temperature)–150° C.] down to 80° C. may be performed at an average cooling rate of 5° C./s to 20° C./s.

The finishing temperature of final hot press forming in the at least one time of the hot press forming may be equal to or lower than the Ms temperature.

The step of heating the steel sheet up to the heating temperature is preferably performed at an average rate of temperature rise of 5° C./s or more in the temperature range from 100° C. up to the heating temperature.

After the hot press forming, tempering may be performed at a temperature of from 100° C. to lower than 600° C.

The steel sheet for use in the method for manufacturing a hot press formed steel member may further contain at least one element selected from the group consisting of:

(a) Cr in a content of 5% or less (excluding 0%),
(b) at least one element selected from the group consisting of Ni and Cu in a total content of 0.5% or less (excluding 0%),
(c) Mo in a content of 1% or less (excluding 0%), and
(d) Nb in a content of 0.1% or less (excluding 0%).

The present invention also includes a hot press formed steel member obtained by the manufacturing method. The present invention further includes a steel automotive part obtained by working the hot press formed steel member.

Advantageous Effects of Invention

The manufacturing method according to the present invention can give a steel member by hot press forming, where the steel member has high strengths and excellent strength-ductility balance, offers good deformation properties (crashworthiness) upon crushing by collision, and is useful as or for high-strength steel parts for automobiles. Unlike conventional hot press forming techniques, the manufacturing method does not require long-term holding at the bottom dead center, can manufacture steel members efficiently, can perform hot press forming multiple times, and has a high degree of freedom in shape to be formed.

BRIEF DESCRIPTION OF DRAWINGS

FIG. 1A, FIG. 1B, and FIG. 1C are explanatory drawings illustrating respectively of before, in the midway, and at the forming bottom dead center of hot press forming in the experimental examples;

FIG. 2A and FIG. 2B are schematic explanatory drawings illustrating a multistage forming process;

FIG. 3A and FIG. 3B are explanatory drawings illustrating multistage forming processes according to embodiments;

FIG. 5 is a schematic explanatory drawing illustrating bulging in a multistage forming process according to an embodiment;

FIG. 6A and FIG. 6B are schematic explanatory drawings illustrating flanging in a multistage forming process according to an embodiment;

FIG. 7A, FIG. 7B, FIG. 7C, and FIG. 7D are schematic explanatory drawings illustrating piercing and (peripheral) trimming in multistage forming processes according to embodiments;

DESCRIPTION OF EMBODIMENTS

Figure 4:
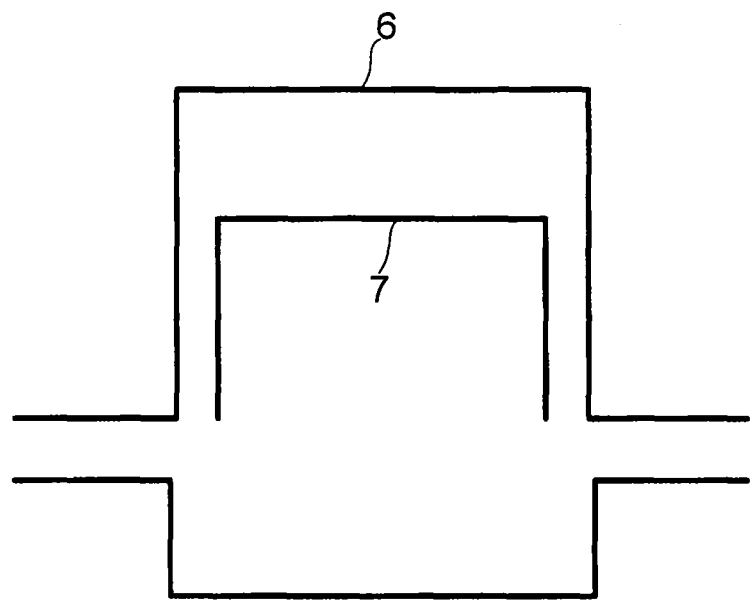
FIG. 4 is a cross-sectional view of a steel member including a reinforcer.

The present inventors made intensive investigations to provide a steel member having the properties. As a result, they have found a specific method for manufacturing a steel member using a steel sheet having a specific chemical composition by heating the steel sheet and subjecting the heated steel sheet to hot press forming at least one time. The method is performed while meeting the conditions (i) to (iii). Specifically, (i) the heating temperature is controlled to equal to or higher than the $Ac_3$ transformation temperature. In addition, (ii) the hot press forming is started at a temperature in the range from the heating temperature down to the Ms temperature. Further, (iii) cooling from [(Ms temperature)−150° C.] down to 80° C. is performed so that a tempering parameter ($\lambda$) as specified by Expression (1) is from 7100 to 8030. The present invention has been made based on these findings.

Reasons why manufacturing conditions including the conditions (i) to (iii) are specified in the present invention will be described in detail below.

Manufacturing Conditions (i) Heating is performed up to a temperature (heating temperature) equal to or higher than the $Ac_3$ transformation temperature Heating up to a temperature equal to or higher than the $Ac_3$ transformation temperature allows the steel member to have a martensite single phase as its microstructure and to have predetermined strengths. The "$Ac_3$ transformation temperature" refers to an austenite transformation temperature and is hereinafter also simply referred to as "$Ac_3$ temperature". The heating, if performed at a temperature lower than the $Ac_3$ transformation temperature, causes ferrite and other phases to remain and to act as nuclei during hot forming and thereby allows ferrite to grow easily. This probably causes the steel member to hardly have high strengths even when the cooling rate after heating is controlled.

The heating temperature is preferably equal to or higher than [($Ac_3$ temperature)+10° C.]. The heating, if performed at an excessively high temperature, may cause the microstructure constituting the steel member to coarsen and may cause the steel member to have inferior strength-ductility balance. To prevent this, the heating temperature may be controlled in upper limit to preferably equal to or lower than about [($Ac_3$ temperature)+180° C.], and more preferably equal to or lower than about [($Ac_3$ temperature)+150° C.].

The holding at the heating temperature may be performed for a time (heating holding time) of preferably 15 minutes or shorter, and more preferably 5 minutes or shorter. This is preferred typically for restraining austenite grain growth. The holding does not have to be performed, namely, the heating-holding time may be zero, as long as the heating temperature falls within the specific range.

The heating may be performed in an atmosphere as selected from oxidizing atmospheres, reducing atmospheres, and non-oxidizing atmospheres. Specifically, the atmosphere is exemplified by air atmosphere, combustion gas atmosphere, and nitrogen gas atmosphere.

In the step of heating the steel sheet up to the heating temperature, the heating is preferably performed at an average rate of temperature rise of 5° C./second or more in the temperature range from 100° C. up to the heating temperature. The heating at such a high rate of temperature rise may refine (reduced the grain size of) the phase (prior austenite) to contribute to still better strength-ductility balance. The average rate of temperature use is more preferably 50° C./s or more, and furthermore preferably 100° C./s or more. The average rate of temperature rise is not critical in upper limit for better strength-ductility balance, but is preferably about 500° C./s or less in consideration typically of the heating equipment size and the size of the part to be manufactured.

(ii) Hot press forming is started at a temperature in the range from the heating temperature down to the Ms temperature.

The hot press forming, when started at a temperature in the range from the heating temperature down to the Ms temperature, enables easy working and sufficiently reduces the forming load of press forming. The hot press forming, if started at a temperature lower than the Ms temperature, is to be performed on a high-strength martensitic steel. Disadvantageously, this causes over loading of press forming because a pressing machine for hot press forming is generally not so powerful, or causes increased risk of delayed fracture due to high residual stress. To prevent this, the hot press forming start temperature is controlled to be equal to or higher than the Ms temperature. The hot press forming start temperature is preferably equal to or higher than [(Ms temperature)+30° C.], and more preferably equal to or higher than [(Ms temperature)+50° C.].

In the present invention, the term "start" of the hot press forming refers to a timing at which part of the steel sheet (blank) first comes in contact with at least part of the tools in first forming. The term "finish" of the hot press forming refers to a timing at which the entire part of the formed product is separated from the tools in final forming.

In the present invention, a starting temperature (in other words, the blank temperature at the timing when part of the blank first comes into contact with at least part of the tools in the first forming) of the hot press forming is specified, while there is no limitation on a finishing temperature (in other words, the blank (steel member) temperature at the timing when the entire formed product (steel member) is separated from the tools in the final forming) of the hot press forming. A preferred finishing temperature of the hot press forming will be described in detail below.

The $Ac_3$ temperature and the Ms temperature are respectively calculated according to Expressions (a) and (b) described in "The Physical Metallurgy of Steels", William C. Leslie (Maruzen Co., Ltd., May 31, 1985, p. 273). In the expressions, an element indicated in the brackets represents the content (in mass percent) of the element, and the calculation may be performed while defining the content of an element not contained in the steel sheet as 0 percent by mass. Expressions (a) and (b) are expressed as follows:

$Ac_3$ temperature (° C.)=910−203×([C]$^{0.5}$)−15.2×[Ni]+44.7×[Si]+31.5×[Mo]−30×[Mn]−11×[Cr]−20×[Cu]+700×[P]+400×[Al]+400×[Ti]   (a)

Ms temperature (° C.)=561−474×[C]−33×[Mn]−17×[Ni]−17×[Cr]−21×[Mo]   (b)

Number of Hot Press Forming and Multistage Forming

The hot press forming may be performed once or multiple times. The hot press forming, when performed multiple times, can give a member having a complicated shape and can provide better dimensional accuracy. A mechanism for providing better dimensional accuracy is as follows.

During the press forming process, different portions of the blank are in contact with the tools for different durations, and this may cause temperature difference (nonuniformity) in the formed product. Typically, assume that the hot press forming is performed once as bending illustrated in FIGS. 1A, 1B and 1C. In this case, the portion A of the blank is in contact with the tools for a long time and undergoes a large temperature reduction (large heat extraction to the tools), and, in contrast, the portions B of the blank are in contact with the tools for a short time and undergo small temperature reduction, each as illustrated in FIGS. 1A, 1B and 1C. Thus, the formed product may have a difference in magnitude of temperature reduction, thereby have a difference in magnitude of thermal shrinkage, undergo thermal deformation (plastic deformation), and have inferior dimensional accuracy.

In an embodiment, the hot press forming is performed as multistage forming, specifically, press forming is performed multiple times at a temperature or temperatures equal to or higher than the Ms temperature. In this embodiment, even when dimensional accuracy deterioration occurs in a previous forming, a subsequent forming is performed still at a high temperature and can easily correct the dimensional accuracy deterioration. In addition, the repeated forming processes also eliminate or mitigate the temperature nonuniformity and thereby more readily reduce the dimensional accuracy deterioration due to the temperature nonuniformity.

In addition, the method, when performing hot press forming in multiple stages as above, can further include a straightening process by shape constraint and advantageously provides better dimensional accuracy, where the dimensional accuracy is an issue in the multistage hot press forming technology. The dimensional accuracy deterioration is an issue in a productivity-oriented multistage hot forming process. The dimensional accuracy deterioration, however, can be dramatically improved by separating the formed product from the tools at a temperature equal to or lower than the Ms temperature in final hot press forming (including the case where hot press forming is performed once), as is described below. Specifically, the final hot press forming is preferably performed at a finishing temperature of equal to or lower than the Ms temperature. In a more preferred embodiment, the formed product is held in contact with the tools (tool constraint) down to [(Ms temperature)−150° C.] before separation. This can give further stably better dimensional accuracy. In particular, this is useful when the member is formed from a thin blank having a thickness typically of 1.4 mm or less, because such thin blank may undergo large dimensional accuracy deterioration upon multistage forming.

The hot press forming, when performed multiple times, may be performed in the same tools, or in two or more different combinations of tools having different shapes, specifically, in tools having shapes differing from one forming process to another.

The hot press forming, when performed as multistage forming, requires a smaller amount of working per process with respect to the finally necessitated amount of working and enables forming of the blank into a member having a more complicated shape.

For example, rear side members and other parts are curved three-dimensionally and have different cross-sectional shapes (width and height) in the longitudinal direction. These parts are generally difficult to be formed into final shapes by a single step. However, the multistage forming process (including multiple steps) as illustrated in FIGS. 2A and 2B enables forming of the parts having such complicated shapes. Specifically, the forming process can be designed as including forming (drawing and/or bending) into a rough shape as in FIG. 2A in the first step, and additional working (redrawing and/or restriking) into a final shape as indicated by the solid line in FIG. 2B in the second step.

In addition, shapes to be worked in the first step and the second step in the multistage forming process may be appropriately designed. Typically, an excess metal portion may be disposed in an appropriate shape, and the order of working operations may be appropriately set. This can provide formed members having significantly complicated shapes as illustrated in FIGS. 3A and 3B. The formed members, when allowed to have such complicated shapes, can contribute to higher functions (e.g., higher rigidity and/or better crashworthiness) and reduced wall thicknesses of the resulting parts.

Actual automotive body structures often employ a structure including a part 6, and a reinforcer 7 inside of the part 6, as illustrated in FIG. 4 (cross-sectional view). Such structures or parts are exemplified by center pillars and rockers. A part, when having such a shape or structure, may resist deformation in sectional shape and can have better crashworthiness upon impact on the part 6. However, the part 6, when allowed to have a complicated shape as described above, can have better crashworthiness in itself. This can omit or, reduce the thickness of, the reinforcer 7 and contribute to lighter weight and lower cost.

In embodiments of the multistage forming, bulging and/or flanging may be performed in the second or later step, as described below. Typically, bulging may be performed in the second or later step in the multistage forming process, as illustrated in FIG. 5. This forming allows the steel member to have an additional bulged shape to thereby have a higher function such as higher rigidity and/or better crashworthiness. Also typically, flanging may be performed in the second or later step in the multistage forming process as illustrated in FIGS. 6A and 6B. The flanging is exemplified by flange up, flange down, stretch flanging, burring, and shrink flanging. This forming can also allow the steel member to have a higher function such as higher rigidity and/or better crashworthiness.

In another embodiment of the multistage forming, piercing or similar process can be performed in a state where the material in the second or later step is soft at a relatively high temperature. Typically, piercing (punching) and/or peripheral trimming (shearing) can be performed in the second or later step as illustrated in FIGS. 7A, 7B, and 7C. This allows piercing and/or trimming to be performed as a process in press forming and enables cost reduction, where such piercing and/or trimming has been performed typically by laser working as an extra step in conventional forming processes including only one step of holding at the bottom dead center. Hot peripheral trimming and/or hot piercing (boring) may also be performed before forming, as illustrated in FIG. 7D.

Hot Press Forming Finishing Temperature (Final Tool-Release Temperature)

The "hot press forming finishing temperature" refers to the finishing temperature of final hot press forming and, when hot press forming is performed only once, refers simply to "finishing temperature of hot press forming". The hot press forming finishing temperature is not critical and may be equal to or higher than the Ms temperature, or equal to or lower than the Ms temperature.

For better dimensional accuracy, the final hot press forming finishing temperature is preferably equal to or lower than the Ms temperature. In this case, the finishing temperature is more preferably equal to or higher than [(Ms temperature)−150° C.]. Specifically, the hot press forming is preferably finished in a temperature range of equal to or lower than the Ms temperature (i.e., at a timing where martensite transformation occurs), where the hot press forming herein refers to final hot press forming in the case of multistage hot press forming. This may provide dramatically better dimensional accuracy both in single-stage forming and multistage forming.

Start Temperatures and Finishing Temperatures in Respective Embodiments of Hot Press Forming Embodiments of the hot press forming are exemplified as follows.

(I) Single-Stage Hot Press Forming (One Forming Operation)

(I-1) The hot press forming is performed at a start temperature of from the heating temperature down to the Ms temperature and at a finishing temperature of equal to or higher than the Ms temperature.

(I-2) The hot press forming is performed at a start temperature of from the heating temperature down to the Ms temperature and at a finishing temperature of equal to or lower than the Ms temperature.

(II) Multistage Hot Press Forming (Multiple Forming Operations)

(II-1) The first hot press forming is performed at a start temperature of from the heating temperature down to the Ms temperature, and the final hot press forming is performed at a finishing temperature of equal to or higher than the Ms temperature.

(II-2) The first hot press forming is performed at a start temperature of from the heating temperature down to the Ms temperature, and the final hot press forming is performed at a finishing temperature of equal to or lower than the Ms temperature.

The hot press forming, when performed multiple times, may further include a reheating process and/or a temperature-keeping process between two press forming processes. However, the hot press forming is preferably performed without reheating and temperature-keeping so that all the hot press forming processes are performed at start temperatures of equal to or higher than the Ms temperature. This is preferred from the viewpoints of productivity, facility cost, and energy cost.

The cooling rate from the heating temperature down to [(Ms temperature)−150° C.] is not critical. Typically, the cooling may be performed from the heating temperature down to [(Ms temperature)−150° C.] at an average cooling rate of 2° C./s or more (more preferably 5° C./s or more). Cooling at a cooling rate within such a range contributes to the formation of martensite in a downstream temperature range of equal to or lower than the Ms temperature while approximately preventing the formation of other phases such as ferrite and bainite. This can easily give a high-strength member. The cooling rate is not critical in upper limit and may be about 500° C./s or less, and preferably 200° C./s or less in consideration of actual operation. For example, the average cooling rate may be controlled to be from 2° C./s to 10° C./s.

The cooling rate can be controlled by any combination of conditions typified as follows:

the time from the retrieval of the blank from the heating furnace to the press forming start (rate upon cooling typically by transfer);

the total contact time with the press forming tools upon hot press forming, where the total contact time is given by multiplying the contact time per one process by the number of forming processes;

the cooling conditions (e.g., natural cooling or forced wind cooling) between adjacent two forming processes when press forming is performed multiple times; and the cooling conditions (e.g., natural cooling or forced wind cooling) after the finish of press forming (after tool release). In particular, it is effective to determine a longer contact time with the press forming tools so as to increase the cooling rate in a temperature of equal to or higher than [(Ms temperature)−150° C.]. These cooling conditions can be previously estimated typically by simulation.

(iii) Cooling from [(Ms temperature)−150° C.] down to 80° C. is performed so that a tempering parameter ($\lambda$) as specified by Expression (1) be from 7100 to 8030, where Expression (1) is expressed as follows:

[Math. 3]

$$\lambda = 293 \times \left\{ \log\left(\frac{\sum_{n=1}^{5000} t'_n}{3600}\right) + 20 \right\} - 430 \times [Si] \quad (1)$$

where $\lambda$ represents the tempering parameter; [Si] represents the content (in mass percent) of Si in the steel; and $t_n'$ represents a value as specified by Expression (2), hereinafter the symbols are as defined above,

[Math. 4]

$$t'_n = 3600 \times 10 \wedge \left\{ \frac{T_{n-1} + 273}{293} \times \left( \log\frac{t_n - t_{n-1}}{3600} + 20 \right) - 20 \right\} \quad (2)$$

where $t_n$ represents an "n-th" time (in second) when a total cooling time from [(Ms temperature)−150° C.] down to 80° C. is divided into 5000 equal parts; $T_n$ represents a temperature (° C.) at the n-th time $t_n$, where to is 0 second, and $T_0$ is [(Ms temperature)−150° C.]; and 10^{ } represents the { }-th power of 10, hereinafter the symbols are as defined above.

According to the present invention, cooling from [(Ms temperature)−150° C.] down to 80° C. is controlled so that a tempering parameter ($\lambda$) as specified by Expression (1) be from 7100 to 8030. The tempering parameter ($\lambda$) is hereinafter also simply referred to as "parameter $\lambda$".

How to derive the parameter $\lambda$ will be initially described.

Expression (1) is derived based on Expression (3). Expression (3) is described typically in "Tekko Zairyo" (edited by The Japan Institute of Metals and Materials) and is generally used for specification of the tempering parameter ($\lambda_g$). Based on Expression (3), the hardness of a martensitic steel upon isothermal holding at a temperature T [K] for a time t [hr] can be presumed. Materials having an identical $\lambda_g$ as specified by Expression (3) have an identical hardness as a result of a heat treatment at any temperature for any time. In the case of steel materials, the constant C may be set to 20. Expression (3) is expressed as follows:

$$\lambda_g = T \times (\log t + C) \quad (3)$$

Figure 8A:
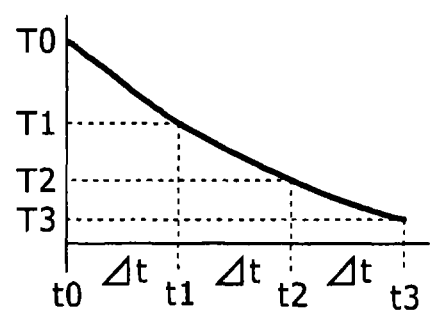
FIG. 8A and FIG. 8B are explanatory drawings illustrating how to derive Expression (1) as specified in the present invention.

Expression (3) is expressed on the assumption that the workpiece is isothermally held, as mentioned above. In contrast, a part (formed product) after hot press forming is generally forcedly cooled with a coolant such as tools, air, or water, and cooling thereof is plotted as continuous cooling as illustrated in FIG. 8A. Expression (3) defined on the assumption of isothermal holding is not applicable to this without modification.

Expression (3) is therefore modified as follows so as to be applicable to a continuous cooling process of the formed product after hot press forming.

Figure 8B:
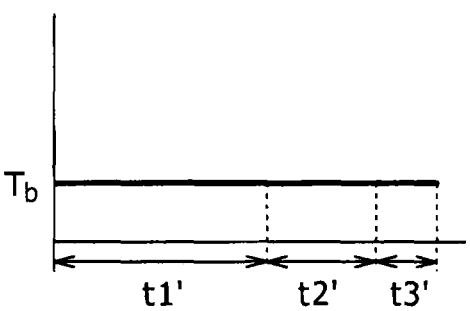

The modification (improvement) is performed based on following considerations. Initially, the cooling curve is divided into micro times at identical intervals and is approximated to a set of micro-time isothermal holding heat treatments, as illustrated in FIG. 8A. The isothermal holdings at temperatures T1, T2, and T3 for a micro time period Δt as exemplified in FIG. 8A are respectively converted into time periods t1', t2', and t3' at a certain base temperature $T_b$ as illustrated in FIG. 8B. The converted time periods are summed up to give a total converted time, and the base expression is applied to assumed isothermal holding at the base temperature $T_b$ for the total converted time [t1'+t2'+t3'].

Next, how to specifically derive the modified expression will be described with reference to FIGS. 8A and 8B as an embodiment.

As illustrated in FIG. 8A, the cooling curve is approximated to three isothermal holding processes. Specifically, isothermal holding is performed at T1 (K) in a time period Δt from t0 to t1; is performed at T2 (K) in a time period Δt from t1 to t2; and is performed at T3 (K) in a time period Δt from t2 to t3. The isothermal holding processes are respectively converted into heat treatments at the base temperature $T_b$ (K) for certain time periods t1', t2', and t3'. Specifically, an isothermal holding process at a temperature higher than the base temperature $T_b$ is converted into a heat treatment for a longer time period; whereas an isothermal holding process at a temperature lower than the base temperature $T_b$ is converted into a heat treatment for a shorter time period.

Typically, when isothermal holding is performed at T1 (K) in the time period Δt from t0 to t1, this isothermal holding process may be converted into a heat treatment at the base temperature $T_b$ (K) for a time period t1' as specified by and derived from Expressions (4) to (6):

$$T_1 \times (\log \Delta t + C) = T_b \times (\log t_1' + C) \quad (4)$$

[Math. 5]

$$\log t_1' = \frac{T_1}{T_b} \times (\log \Delta t + C) - C \quad (5)$$

[Math. 6]

$$t_1' = 10 \wedge \left\{ \frac{T_1}{T_b} \times (\log \Delta t + C) - C \right\} \quad (6)$$

The time periods t2' and t3' are determined in a similar manner, and the converted time periods t1', t2', and t3' are summed up, and the total sum is substituted into Expression (3) to give Expression (7):

$$\lambda = T_b \times \{\log(t_1' + t_2' + t_3') + C\} \quad (7)$$

Expression (7) and Expression (6) are generalized to respectively give Expression (8) and Expression (9):

$$\lambda = T_b \times \{\log(\Sigma t_n') + C\} \quad (8)$$

where $t_n'$ is a value as specified by Expression (9):

[Math. 7]

$$t_n' = 10 \wedge \left\{ \frac{T_n}{T_b} \times (\log \Delta t + C) - C \right\} \quad (9)$$

In this connection, the measurement temperature and the measurement time are respectively in "degree in Celsius scale (° C.)" and in "second (sec)". In contrast, the temperature and the time in Expression (9) as derived from the base expression are respectively indicated in "Kelvin scale (K)" and in "hour (hr)". The systems of units in Expression (9) are converted respectively into the degree in Celsius scale (° C.) and the second (s, sec). The base temperature $T_b$ can be any temperature, but is herein defined as 20° C. The constant C is defined as 20, a value that is generally used in steel materials. The systems of units are converted, and the base temperature $T_b$ of 20° C. and the constant C of 20 are substituted into Expression (9) to give Expression (10):

[Math. 8]

$$t_n' = 3600 \times 10 \wedge \left\{ \frac{T_n + 273}{293} \times \left( \log \frac{\Delta t}{3600} + 20 \right) - 20 \right\} \quad (10)$$

In addition, calculation according to Expression (8) is performed by dividing the entire cooling process into 5000 parts. The number "n" therefore takes a value of from 1 to 5000. The temperature specified by [(Ms temperature)−150° C.] is defined as a starting point. Accordingly, $t_0$ is 0 (sec), $T_0$ is [(Ms temperature)−150° C.], and Δt is $[t_n - t_{n-1}]$. These conditions (parameters) are substituted into Expression (8) and Expression (10) to respectively give Expression (11) and Expression (2):

[Math. 9]

$$\lambda = 293 \times \left\{ \log\left( \frac{\sum_{n=1}^{5000} t_n'}{3600} \right) + 20 \right\} \quad (11)$$

where $t_n'$ is as specified by Expression (2):

[Math. 10]

$$t_n' = 3600 \times 10 \wedge \left\{ \frac{T_{n-1} + 273}{293} \times \left( \log \frac{t_n - t_{n-1}}{3600} + 20 \right) - 20 \right\} \quad (2)$$

Next, Expression (11) is modified into an expression in consideration of resistance to temper softening due to Si addition. The tempering parameter ($\lambda_g$) in the base expression, Expression (3), is not affected by chemical composition variation. In contrast, silicon (Si) effectively increases the resistance to temper softening, and the tempering parameter becomes apparently smaller with an increasing Si content. Specifically, Si affects the tempering parameter. The tempering parameter used herein is calculated while defining the specific temperature [(Ms temperature)−150° C.] as the starting point ($T_0$) where the specific temperature is determined by steel chemical compositions. The tempering parameter is therefore adaptable to variations of chemical compositions within the specific ranges. However, the expression for the Ms temperature lacks the term of Si content, and the term of Si content is added. The tempering parameter apparently decreases with an increasing Si content as described above, and a minus (negative) term in consideration of the Si content is added to Expression (11) to give Expression (1). The Si content in Expression (1) has a coefficient of 430, where the coefficient has been experimentally determined. Expression (1) is expressed as follows:

[Math. 11]

$$\lambda = 293 \times \left\{ \log\left(\frac{\sum_{n=1}^{5000} t'_n}{3600}\right) + 20 \right\} - 430 \times [Si] \quad (1)$$

where $t_n'$ is as specified by Expression (2):

[Math. 12]

$$t'_n = 3600 \times 10^{\wedge}\left\{\frac{T_{n-1}+273}{293} \times \left(\log\frac{t_n - t_{n-1}}{3600} + 20\right) - 20\right\} \quad (2)$$

The tempering parameter may also be determined by determining tempering parameters of micro times one by one, and summing up the determined tempering parameters. However, $\lambda_g$ as specified by the base expression, Expression (3), is defined in order to determine a parameter in a single heat treatment process. If parameters obtained in two or more processes are summed up to give a value, the resulting value may become abnormal (extremely high) and does not meet the parameter in actual operation.

The cooling herein is performed so that the parameter λ as specified by the above-defined expression be 7100 or more. The parameter λ of 7100 corresponds to cooling in the range from [(Ms temperature)−150° C.] down to 80° C. at a cooling rate of about 20° C./s (holding time in the tools of 10 seconds). The cooling, if performed at a parameter λ of less than 7100, may require a long holding time in the tools to cause poor productivity, differing little from conventional methods. The parameter λ is preferably 7300 or more, and more preferably 7500 or more. In contrast, the cooling, if performed at a parameter λ of greater than 8030, may fail to allow the steel member to have desired strength-ductility balance. To prevent this, the cooling from [(Ms temperature)−150° C.] down to 80° C. may be performed so that the parameter λ is 8030 or less. The parameter λ is preferably 7900 or less, and more preferably 7800 or less.

The cooling herein from [(Ms temperature)−150° C.] down to 80° C. has only to be performed so that the parameter λ fall within the specific range, and can be performed by any specific procedure not limited. The cooling procedure is exemplified by forced wind cooling and natural cooling. The cooling process from [(Ms temperature)−150° C.] down to 80° C. may be performed at an identical (constant) cooling rate or at a varying cooling rate according to temperature ranges, as long as the parameter (λ) falls within the range. The manufacturing method may further include an isothermal holding process and/or a reheating process in the midway of cooling from [(Ms temperature)−150° C.] down to 80° C., as long as the parameter (λ) falls within the range. When the method includes the isothermal holding process, the workpiece may, for example, be held in a holding furnace and then cooled by the cooling procedure.

In an embodiment of cooling performed so that the parameter λ fall within the range, the workpiece may be cooled from [(Ms temperature)−150° C.] down to 80° C. at an average cooling rate of from 5° C./s to 20° C./s.

The cooling, if performed at an average cooling rate of greater than 20° C./s, may require a long holding time in the tools to cause poor productivity, thus differing little from the conventional methods. The average cooling rate is more preferably 15° C./s or less. In contrast, the cooling, if performed at an excessively low average cooling rate, may fail to allow the steel member to have desired strength-ductility balance. To prevent this, the average cooling rate is preferably 5° C./s or more, and more preferably 10° C./s or more.

Cooling from 80° C. down to room temperature may be performed at any cooling rate not critical. Typically, the cooling may be performed by natural cooling.

Tempering after Hot Press Forming

The method may further include, after the hot press forming, tempering at a temperature of from 100° C. to lower than 600° C. The blank (also the resulting steel member) has a specific chemical composition system as mentioned later and can therefore undergo strength adjustment by the tempering without impairing the strength-ductility balance (TS×EL balance). For sufficient tempering effects, the tempering is preferably performed at a temperature of 100° C. or higher, and more preferably 200° C. or higher. In contrast, the tempering, if performed at a temperature of 600° C. or higher, may fail to allow the steel member to have a high yield stress (YS). To prevent this, the tempering, when employed, is preferably performed at a temperature of lower than 600° C., and more preferably 300° C. or lower. The tempering may be performed for a time (holding time at the tempering temperature) of 60 minutes or shorter so as to control costs.

Blank (Steel Sheet) for Use in Hot Press Forming

Next, the blank (steel sheet) for use in the hot press forming will be illustrated. Initially, the blank for use in the manufacturing method has a chemical composition as follows.

Blank Chemical Composition

Carbon (C): 0.15% to 0.4%

To allow the steel member to have a tensile strength of 980 MPa or more, the carbon content may be 0.15% or more, preferably 0.17% or more, and more preferably 0.20% or more. In contrast, in consideration of weldability of the resulting member, the carbon content may be 0.4% or less, preferably 0.30% or less, and more preferably 0.26% or less in terms of upper limit.

Silicon (Si): Greater than 1.0% to 1.65%

Silicon (Si) essentially increases the resistance to temper softening and ensures high strengths (to ensure excellent strength-ductility balance). Si also effectively gives better ductility of weld beads after the member is subjected to welding. Si is also effective for ensuring excellent delayed fracture resistance. To have such effects sufficiently, the Si content may be controlled to greater than 1.0%, preferably 1.1% or more, and more preferably 1.2% or more. In contrast, Si, if contained in excess, may cause significant occurrence of internal oxidation (grain boundary oxidation) in the hot rolling process and may cause the subsequent acid wash process to proceed at a significantly low rate, resulting in inferior productivity. To prevent this, the Si content may be controlled to 1.65% or less, preferably 1.45% or less, and more preferably 1.35% or less.

Aluminum (Al): 0.5% or Less (Excluding 0%)

Aluminum (Al) is used for deoxidation, and, for this purpose, the Al content is preferably 0.01% or more. In contrast, Al, if contained in an excessively high content, may cause the $Ac_3$ temperature to be raised, and this may require a higher heating temperature upon hot press forming, resulting in inferior production efficiency. To prevent this, the Al content may be controlled to 0.5% or less, preferably 0.20% or less, more preferably 0.10% or less, and furthermore preferably 0.050% or less.

Manganese (Mn): 1% to 3.5%

Manganese (Mn) is necessary to allow the steel sheet to have better hardenability to thereby give a member having high strengths. From the viewpoint, the Mn content may be controlled to 1% or more, preferably 1.5% or more, more preferably 1.8% or more, and furthermore preferably 2.0% or more. However, Mn, if contained in a content of greater than 3.5%, may exhibit saturated effects and cause increased cost. To prevent this, the Mn content is controlled herein to 3.5% or less, preferably 3.0% or less, and more preferably 2.8% or less.

Titanium (Ti): 0.10% or Less (Excluding 0%)

Titanium (Ti) fixes nitrogen (N) as TiN, allows boron (B) as a solute, and thereby effectively ensure hardenability. From the viewpoint, the Ti content is preferably 0.015% or more, and more preferably 0.020% or more. In contrast, Ti, if contained in an excessively high content, may cause the material steel sheet (blank) to have strengths higher than necessary and cause shorter lives of cutting-piercing tools, resulting in increased cost. To prevent this, the Ti content may be controlled to 0.10% or less, preferably 0.06% or less, and more preferably 0.04% or less.

Boron (B): 0.005% or Less (Excluding 0%)

Boron (B) allows the steel to have better hardenability and to have high strengths even subjected to slow cooling and is necessary. To have the effects, boron may be contained in a content of preferably 0.0003% or more, more preferably 0.0015% or more, and furthermore preferably 0.0020% or more. In contrast, boron, if contained in excess, may form boron nitride (BN) in excess to cause toughness deterioration. To prevent this, the boron content may be controlled to 0.005% or less, preferably 0.0040% or less, and more preferably 0.0035% or less.

The steel (the blank, also the steel member) herein has the chemical composition as above, with the remainder including iron and inevitable impurities such as P, S, N, 0, As, Sb, and Sn. Of such inevitable impurities, phosphorus (P) and sulfur (S) contents are preferably controlled each to 0.02% or less. Nitrogen (N), if contained in an excessively high content, may cause toughness deterioration after hot forming and/or weldability deterioration. To prevent this, the nitrogen content is preferably controlled to 0.01% or less. Oxygen (O) causes surface flaws. To prevent this, the oxygen content is preferably controlled to 0.001% or less.

The steel may further contain one or more of additional elements as follows within ranges not adversely affecting advantageous effects of the present invention.

Chromium (Cr): 5% or Less (Excluding 0%)

Chromium (Cr) effectively allows the steel sheet to have better hardenability and to surely have excellent oxidation resistance. Specifically, the steel sheet becomes resistant to scale generation upon heating before press forming. To have these effects, Cr may be contained in a content of preferably 0.01% or more, and more preferably 0.1% or more. However, Cr, if contained in excess, may have saturated effects and cause increased cast. To prevent this, the Cr content may be controlled in upper limit of preferably 5%, more preferably 3.5% or less, and furthermore preferably 2.5% or less.

At least one element selected from the group consisting of nickel (Ni) and copper (Cu): total content of 0.5% or less (excluding 0%)

Nickel (Ni) and copper (Cu) effectively allow the steel sheet to have better hardenability and allow the formed product to have better delayed fracture resistance and better oxidation resistance. To have these effects, at least one of the elements may be contained in a total content of preferably 0.01% or more, and more preferably 0.1% or more. However, the elements, if contained in excess, may cause surface flaws upon the steel sheet manufacturing. This may result in inferior acid wash properties and inferior productivity. To prevent this, the total content of these elements is preferably 0.5% or less, and more preferably 0.3% or less.

Molybdenum (Mo): 1% or Less (Excluding 0%)

Molybdenum (Mo) effectively allows the steel sheet to have better hardenability. The steel sheet, when containing this element, is expected to allow the formed product to have reduced hardness variation (to be less nonuniform in hardness). To have these effects, the element may be contained in a content of preferably 0.01% or more, and more preferably 0.1% or more. However, Mo, if contained in excess, may have saturated effects and cause increased cost. To prevent this, the Mo content is controlled in upper limit to preferably 1%, more preferably 0.8% or less, and furthermore preferably 0.5% or less.

Niobium (Nb): 0.1% or Less (Excluding 0%)

Niobium (Nb) effectively refines the microstructure and contributes to better toughness. Nb, when contained, may be contained in a content of preferably 0.005% or more, and more preferably 0.01% or more. In contrast, Nb, if contained in excess, may cause the material steel sheet (blank) to have excessively high strengths, and this may shorten the lives of tools used in a blanking process and cause increased cost, where the blanking process is the process typically of cutting the blank into a predetermined shape before hot press forming. To prevent this, the Nb content may be controlled to preferably 0.1% or less, and more preferably 0.05% or less.

Blank Manufacturing Method

Such blank having a chemical composition meeting the conditions may be manufactured by any method not limited. The blank may for example be manufactured by performing casting, heating, hot rolling, further acid wash, cold rolling, and, as needed, annealing each according to a common procedure. The resulting hot-rolled steel sheet or cold-rolled steel sheet may be further subjected to coating (e.g., zinc-containing coating). Specifically, there can be used coated steel sheets (e.g., galvanized steel sheets); and hot-dip galvannealed steel sheets that are obtained by further alloying the coated steel sheets.

Hot-Press Formed Steel Member

The hot press formed steel member obtained by the method according to the present invention has a chemical composition identical to that of the blank (steel sheet) used. The steel member is not limited in microstructure. The microstructure of the steel member is exemplified by one including martensite phase alone; and one including martensite as a matrix and further including retained austenite (retained y) in a content of 2 percent by volume or more, preferably 3 percent by volume or more, and more preferably 5 percent by volume or more, relative to the entire microstructure. The steel member containing retained y in a content of 2 percent by volume or more may excel in tensile elongation (ductility), crashworthiness, and delayed fracture resistance, as described above.

The steel member may include, as the steel microstructure, the retained y with the remainder approximately including low-temperature transformation phases such as martensite, tempered martensite, bainite, and bainitic ferrite. The term "approximately" refers to that the steel member may include ferrite and other transformation phases that are formed at a temperature equal to or higher than the Ms temperature, as phases that are inevitably formed in the manufacturing process.

The resulting steel member may be subjected to cutting (machining) such as trimming and/or piecing to give, for example, a steel automotive part.

The steel member may be used as a steel automotive part as intact or with working (processing) as mentioned above. The steel automotive part is exemplified by impact bars, bumpers, reinforcements, and center pillars.

The present application claims priority to Japanese Patent Application No. 2013-007808 filed on Jan. 18, 2013, the entire contents of which are incorporated herein by reference.

EXAMPLES

The present invention will be illustrated in further detail with reference to several examples (experimental examples) below. It should be noted, however, that the examples are by no means intended to limit the scope of the invention; that various changes and modifications can naturally be made therein without deviating from the spirit and scope of the invention as described herein; and all such changes and modifications should be considered to be within the scope of the invention.

Experimental Example 1

Steel sheets having chemical compositions given in Table 1 (with the remainder including iron and inevitable impurities) were prepared as blanks. The steel sheets dimensionally had a thickness of 1.4 mm, a width of 190.5 mm, and a length of 400 mm. The steel sheets were subjected to hot press forming as press forming according to the procedure illustrated in FIG. 9. The hot press forming is hereinafter also simply referred to as "press forming" or "pressing". Table 1 also indicates $Ac_3$ temperatures and Ms temperatures as calculated by the expressions. The calculations according to the expressions for the $Ac_3$ temperatures and Ms temperatures were performed while defining the content of an element not contained as zero.

Each sample in Experimental Example 1 was manufactured under conditions as follows. Specifically, the blank was heated at 900° C. (heating temperature) for 6 minutes and subjected to hot press forming at a start temperature of from 800° C. to 700° C. During the process of heating the steel sheet (blank) up to the heating temperature, the steel sheet was heated in the range from 100° C. up to the heating temperature at an average rate of temperature rise of about 10° C./s. The steel sheet was cooled from the heating temperature down to [(Ms temperature)–150° C.] at an average cooling rate of 10 to 30° C./s.

Figure 10:
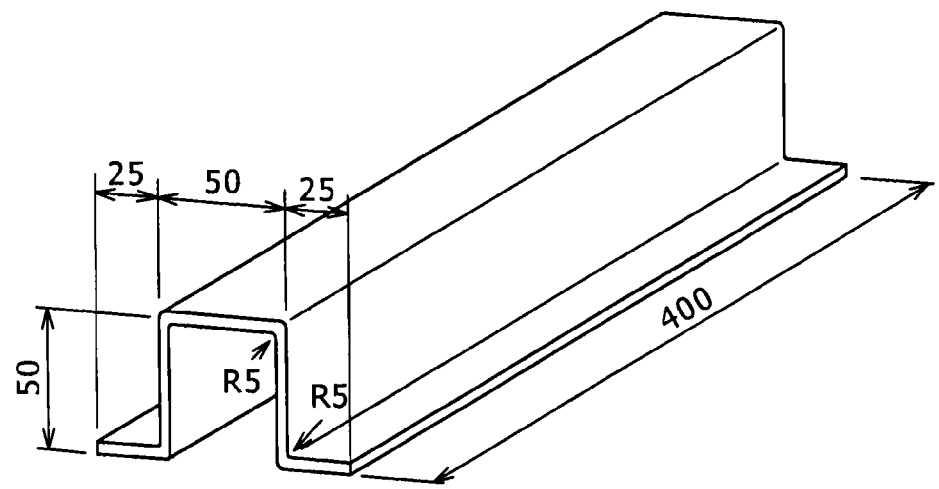
FIG. 10 is a schematic perspective view illustrating the shape of a steel member obtained in the experimental examples.

The hot press forming was performed as press forming (bending (form) using a leading pad) as illustrated in FIGS. 1A, 1B and 1C using a pressing machine (400-ton mechanical press) to give a hat channel steel member illustrated in FIG. 10. The leading pad employed, as a pressure source, a spring having force of about 1 ton.

FIGS. 1A, 1B and 1C illustrate the forming process. FIGS. 1A, 1B and 1C illustrate a punch 1, a die 2, a leading pad 3, a steel sheet (blank) 4, and a pin (spring-integrated float pin) 5.

As illustrated in FIG. 1A, the spring-integrated pins 5 are placed on the tools (die 2 and leading pad 3), and the blank 4 retrieved from the heating furnace is once placed on the pins 5. This is performed so as to minimize the contact between the blank 4 and the tools (die 2 and leading pad 3) before press forming start.

FIG. 1B illustrates a state during the forming, i.e. a state during depressing of the punch 1. FIG. 1C illustrates a state where the punch 1 is depressed down and reaches the bottom dead center (lower limit position).

As in after-mentioned Table 2, Test No. 16 was subjected to press forming three times, and Test Nos. 17 and 18 were subjected to press forming four times.

Figure 9:
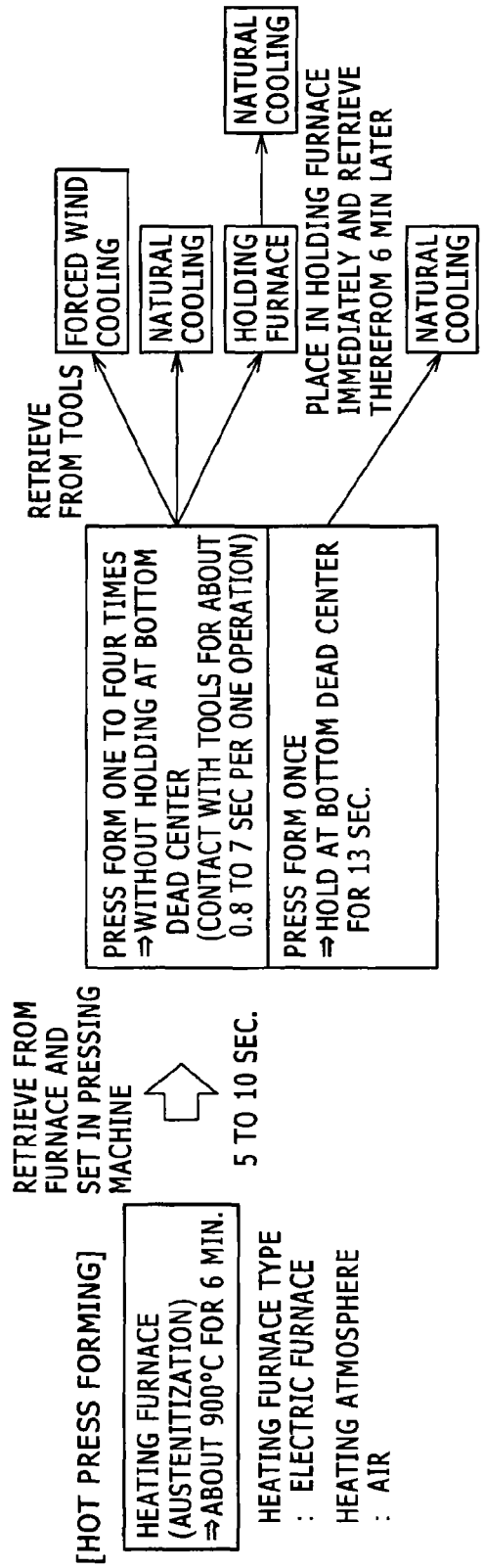
FIG. 9 is a process chart illustrating hot press forming in the experimental examples.

Test Nos. 1 to 7 and 10 to 51 in Tables 2 and 3 were held in the tools for a time (tool contact time, bottom dead center holding time) of from about 0.8 to about 7 seconds as in FIG. 9. Among them, Test Nos. 3, 4, and 19 in Table 2 were held in the tools for a time of about 7 seconds.

After the hot press forming, cooling down to mom temperature was performed as illustrated in FIG. 9. Specifically, after the press forming, Test Nos. 1, 2, 11 to 14, 17, 18, and 20 to 51 in Tables 2 and 3 were cooled by forced wind cooling; whereas Test Nos. 10, 15, and 16 in Table 2 were cooled by natural cooling. After the hot pressing, Test Nos. 5 to 7 in Table 2 was held in a holding furnace for 6 minutes and then naturally cooled. In contrast, Test Nos. 3, 4, and 19 in Table 2 were naturally cooled after press forming. Test Nos. 8 and 9 in Table 2 were also naturally cooled after press forming.

Figure 11:
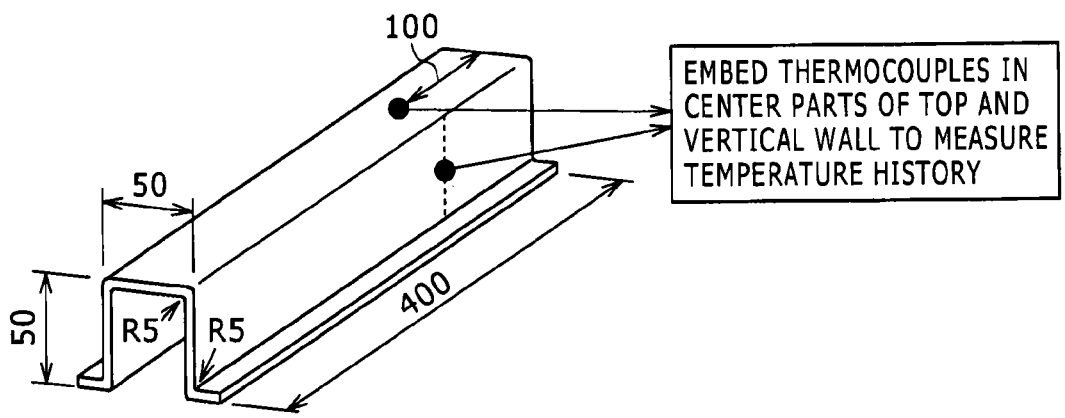
FIG. 11 is a schematic perspective view illustrating a position where thermocouple are embedded to measure the temperature of a steel sheet in the experimental examples.

As illustrated in FIG. 11, thermocouples were embedded at positions corresponding to the center parts of the top and the vertical wall of the resulting steel member to measure the temperature history of the steel sheet upon steel member manufacturing. The temperatures measured at the two positions were approximately identical.

A cooling time from [(Ms temperature)–150° C.] down to 80° C. was read out from the measured temperature history to calculate an average cooling rate and a tempering parameter ($\lambda$) as indicated in Tables 2 and 3. Specifically, the tempering parameter was calculated while defining to of 0 (second) and $T_0$ of [Ms–150° C.] as starting points, and setting the measured cooling history from [(Ms temperature)–150° C.] down to 80° C. and the Si content. A final tool release temperature indicated in Tables 2 and 3 was determined based on the temperatures indicated by the thermocouples and the positions of the tools at that time. In this experimental example, the final tool release temperature corresponds to the final hot press forming finishing temperature.

The thus-obtained steel members (formed members) were each subjected to a tensile test and productivity evaluation by methods as follows. The prepared steel members each included a martensite single phase as a microstructure.

Tensile Test

Figure 12:
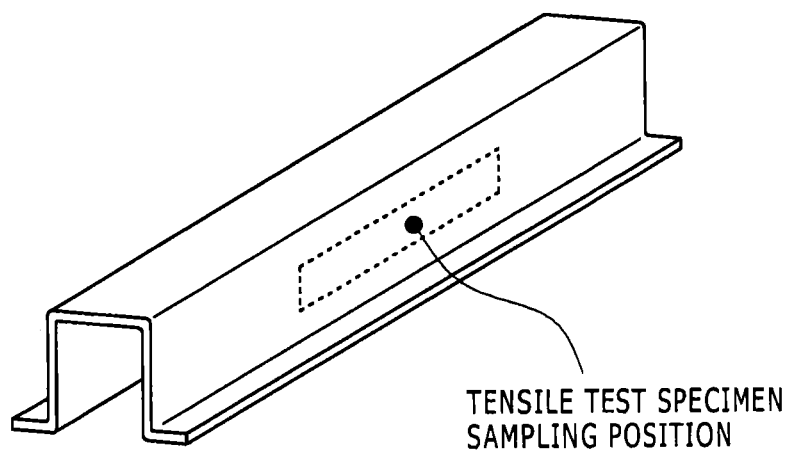
FIG. 12 is a schematic perspective view illustrating a position where a test specimen for tensile test is sampled from a steel member in the experimental examples.

From a portion of the formed part (steel member), a JIS No. 5 test specimen was cut out as a tensile test specimen, as illustrated in FIG. 12. The test specimen was subjected to the tensile test by the method prescribed in JIS Z 2241 using AG-IS 250 kN Autograph Tensile Tester (Shimadzu Corporation) to measure a yield strength (YS), a tensile strength (TS), and an elongation (EL). The test was performed at a strain rate of 10 min/min. Based on the data, the product (TS×EL: MPa·%) of the tensile strength TS and the elongation EL was determined.

Productivity Evaluation

The productivity was evaluated by the length of the in-tool holding time, where the in-tool holding is a rate-determining step in the hot press forming process. A sample underwent in-tool holding for a time of 10 seconds or longer was evaluated as being equivalent to conventional techniques and as having poor productivity (x); whereas a sample underwent in-tool holding for a time of shorter than 10 seconds was evaluated as having good productivity (◯).

Results of these are indicated in Tables 2 and 3.

TABLE 1

| Blank code | C | Si | Mn | P | S | Al | Cr | Ti | B | N | Cu | Ni | Mo | Nb | Ac₃ [°C.] | Ms [°C.] | Blank type |
|---|---|---|---|---|---|---|---|---|---|---|---|---|---|---|---|---|---|
| A | 0.216 | 1.21 | 2.19 | 0.009 | 0.001 | 0.040 | — | 0.022 | 0.0020 | 0.0040 | — | — | — | — | 835 | 386 | As cold-rolled |
| B | 0.225 | 1.12 | 1.17 | 0.009 | 0.001 | 0.040 | 0.18 | 0.020 | 0.0021 | 0.0039 | — | — | — | — | 857 | 413 | As cold-rolled |
| C | 0.214 | 1.30 | 2.28 | 0.010 | 0.003 | 0.036 | 0.12 | 0.021 | 0.0015 | 0.0055 | — | — | — | — | 834 | 382 | As cold-rolled |
| D | 0.218 | 1.31 | 2.05 | 0.009 | 0.003 | 0.036 | 0.12 | 0.021 | 0.0014 | 0.0041 | — | — | — | — | 840 | 388 | As cold-rolled |
| E | 0.220 | 1.35 | 1.82 | 0.008 | 0.003 | 0.039 | 0.12 | 0.021 | 0.0015 | 0.0043 | — | — | — | — | 849 | 395 | As cold-rolled |
| F | 0.221 | 1.49 | 2.47 | 0.010 | 0.003 | 0.035 | 0.11 | 0.021 | 0.0013 | 0.0039 | — | — | — | — | 835 | 373 | As cold-rolled |
| G | 0.215 | 1.31 | 2.47 | 0.009 | 0.003 | 0.036 | 0.11 | 0.021 | 0.0013 | 0.0043 | — | — | — | — | 828 | 376 | As cold-rolled |
| H | 0.218 | 0.90 | 2.48 | 0.007 | 0.003 | 0.035 | 0.11 | 0.021 | 0.0013 | 0.0042 | — | — | — | — | 807 | 374 | As cold-rolled |
| I | 0.219 | 0.20 | 3.02 | 0.007 | 0.003 | 0.037 | 0.22 | 0.020 | 0.0014 | 0.0041 | — | — | — | — | 759 | 354 | As cold-rolled |
| J | 0.211 | 0.04 | 1.20 | 0.006 | 0.001 | 0.043 | 0.25 | 0.038 | 0.0038 | 0.0064 | — | — | — | — | 816 | 417 | As cold-rolled |
| K | 0.221 | 1.14 | 2.20 | 0.008 | 0.001 | 0.045 | — | 0.025 | 0.0020 | 0.0035 | 0.09 | 0.1 | — | — | 830 | 382 | As cold-rolled |
| L | 0.216 | 1.15 | 2.10 | 0.009 | 0.001 | 0.044 | — | 0.024 | 0.0018 | 0.0038 | — | — | 0.11 | — | 841 | 387 | As cold-rolled |
| M | 0.219 | 1.10 | 2.22 | 0.008 | 0.001 | 0.042 | — | 0.020 | 0.0018 | 0.0041 | — | — | — | 0.05 | 828 | 384 | As cold-rolled |
| N | 0.223 | 1.12 | 1.86 | 0.007 | 0.001 | 0.036 | 0.21 | 0.020 | 0.0020 | 0.0046 | — | — | — | — | 833 | 390 | As cold-rolled |
| O | 0.221 | 1.13 | 1.83 | 0.008 | 0.001 | 0.036 | 0.41 | 0.020 | 0.0021 | 0.0042 | — | — | — | — | 834 | 389 | As cold-rolled |
| P | 0.202 | 1.14 | 1.83 | 0.008 | 0.001 | 0.038 | 1.04 | 0.021 | 0.0024 | 0.0049 | — | — | — | — | 833 | 387 | As cold-rolled |
| Q | 0.206 | 1.14 | 1.63 | 0.009 | 0.001 | 0.039 | 1.55 | 0.021 | 0.0020 | 0.0049 | — | — | — | — | 833 | 383 | As cold-rolled |
| R | 0.207 | 1.12 | 1.42 | 0.009 | 0.001 | 0.038 | 2.02 | 0.021 | 0.0023 | 0.0047 | — | — | — | — | 833 | 382 | As cold-rolled |
| S | 0.252 | 1.13 | 1.69 | 0.006 | 0.003 | 0.036 | — | 0.020 | 0.0013 | 0.0043 | — | — | — | — | 835 | 386 | As cold-rolled |
| T | 0.227 | 1.14 | 1.71 | 0.006 | 0.003 | 0.037 | — | 0.021 | 0.0014 | 0.0039 | — | — | — | — | 840 | 397 | As cold-rolled |

Blank chemical composition [in mass percent] with the remainder including iron and inevitable impurities

TABLE 2

| Test number | Blank code | Si content [in mass percent] | Number of press forming [number] | Final tool release temperature [°C.] | Ms temperature [°C.] | Ms − 150° C. [°C.] | Average cooling rate from (Ms − 150° C.) to 80° C. [°C./s] | Tempering parameter (λ) | YS [MPa] | TS [MPa] | EL [%] | TS × EL [MPa·%] | Productivity |
|---|---|---|---|---|---|---|---|---|---|---|---|---|---|
| 1 | H | 0.90 | 1 | 380 | 374 | 224 | 2.3 | 7735 | 888 | 1454 | 7.5 | 10901 | ○ |
| 2 | I | 0.20 | 1 | 280 | 354 | 204 | 1.0 | 7857 | 1037 | 1528 | 8.2 | 12532 | ○ |
| 3 | I | 0.20 | 1 | 80 | 354 | 204 | 15.4 | 7301 | 1098 | 1595 | 7.7 | 12280 | ○ |
| 4 | J | 0.04 | 1 | 80 | 417 | 267 | 19.1 | 8446 | 905 | 1401 | 7.1 | 5858 | ○ |
| 5 | C | 1.30 | 1 | 380 | 382 | 232 | 0.4 | 8085 | 931 | 1354 | 8.0 | 10831 | ○ |
| 6 | A | 1.21 | 1 | 380 | 384 | 234 | 0.3 | 8237 | 958 | 1448 | 8.8 | 12745 | ○ |
| 7 | A | 1.21 | 1 | 380 | 384 | 234 | 0.4 | 8174 | 966 | 1467 | 8.1 | 11879 | ○ |
| 8 | A | 1.21 | 1 | 50 | 384 | 234 | 29.5 | 7091 | 1214 | 1731 | 7.8 | 13502 | X |
| 9 | F | 1.49 | 1 | 50 | 373 | 223 | 25.0 | 6773 | 1153 | 1722 | 7.3 | 12571 | X |
| 10 | C | 1.30 | 1 | 380 | 382 | 232 | 0.8 | 7934 | 864 | 1476 | 9.2 | 13579 | ○ |
| 11 | C | 1.30 | 1 | 380 | 382 | 232 | 1.2 | 7846 | 878 | 1502 | 9.7 | 14569 | ○ |
| 12 | C | 1.30 | 1 | 380 | 382 | 232 | 2.3 | 7705 | 914 | 1545 | 8.8 | 13596 | ○ |
| 13 | C | 1.30 | 1 | 380 | 382 | 232 | 7.0 | 7464 | 985 | 1576 | 9.5 | 14972 | ○ |
| 14 | C | 1.30 | 1 | 380 | 382 | 232 | 19.1 | 7246 | 970 | 1578 | 9.0 | 14202 | ○ |
| 15 | A | 1.21 | 1 | 600 | 384 | 234 | 0.8 | 8024 | 962 | 1533 | 9.2 | 14105 | ○ |
| 16 | A | 1.21 | 3 | 380 | 384 | 234 | 0.8 | 8024 | 974 | 1523 | 9.1 | 13862 | ○ |
| 17 | A | 1.21 | 4 | 280 | 384 | 234 | 1.2 | 7935 | 1012 | 1586 | 9.8 | 15547 | ○ |
| 18 | A | 1.21 | 4 | 80 | 384 | 234 | 19.0 | 7335 | 1102 | 1623 | 10.2 | 16552 | ○ |
| 19 | B | 1.12 | 1 | 80 | 413 | 263 | 19.0 | 7339 | 1053 | 1576 | 9.4 | 14811 | ○ |
| 20 | K | 1.14 | 1 | 380 | 382 | 232 | 2.3 | 7742 | 1050 | 1550 | 9.0 | 13950 | ○ |
| 21 | L | 1.15 | 1 | 380 | 387 | 237 | 2.3 | 7881 | 988 | 1502 | 9.1 | 13668 | ○ |
| 22 | M | 1.10 | 1 | 380 | 384 | 234 | 2.3 | 7807 | 1110 | 1582 | 8.9 | 14080 | ○ |
| 23 | F | 1.49 | 1 | 380 | 373 | 223 | 2.3 | 7465 | 888 | 1483 | 9.1 | 13555 | ○ |
| 24 | F | 1.49 | 1 | 380 | 373 | 223 | 6.8 | 7234 | 935 | 1511 | 9.5 | 14294 | ○ |
| 25 | G | 1.31 | 1 | 380 | 376 | 226 | 2.2 | 7584 | 824 | 1486 | 9.2 | 13671 | ○ |
| 26 | G | 1.31 | 1 | 380 | 376 | 226 | 6.7 | 7346 | 900 | 1510 | 9.3 | 14074 | ○ |
| 27 | G | 1.31 | 1 | 380 | 376 | 226 | 16.3 | 7157 | 992 | 1527 | 9.4 | 14295 | ○ |
| 28 | D | 1.31 | 1 | 380 | 383 | 233 | 7.2 | 7576 | 953 | 1453 | 9.4 | 13661 | ○ |
| 29 | D | 1.31 | 1 | 380 | 383 | 233 | 16.4 | 7395 | 999 | 1473 | 10.0 | 14726 | ○ |
| 30 | E | 1.35 | 1 | 380 | 395 | 245 | 7.1 | 7686 | 915 | 1431 | 9.5 | 13593 | ○ |
| 31 | E | 1.35 | 1 | 380 | 395 | 245 | 17.4 | 7485 | 955 | 1459 | 9.6 | 14006 | ○ |

Each test was performed at a heating temperature of 900° C. and a forming start temperature of 800° C. to 700° C.
Each test was performed at an average rate of temperature rise of about 10° C./s in the range from 100° C. up to the heating temperature

TABLE 3

| Test number | Blank code | Si content [in mass percent] | Number of press forming [number] | Final tool release temperature (° C.) | Ms temperature (° C.) | Ms − 150° C. [° C.] | Average cooling rate from (Ms − 150° C.) to 80° C. [° C./s] | Tempering parameter (λ) | YS [MPa] | TS [MPa] | EL [%] | TS × EL [MPa · %] | Productivity |
|---|---|---|---|---|---|---|---|---|---|---|---|---|---|
| 32 | N | 1.12 | 1 | 350 | 390 | 240 | 1.1 | 8023 | 982 | 1506 | 9.8 | 14759 | ◯ |
| 33 | N | 1.12 | 1 | 350 | 390 | 240 | 2.2 | 7871 | 999 | 1535 | 9.7 | 14890 | ◯ |
| 34 | N | 1.12 | 1 | 350 | 390 | 240 | 5.6 | 7666 | 1002 | 1601 | 9.5 | 15210 | ◯ |
| 35 | O | 1.13 | 1 | 350 | 389 | 239 | 0.8 | 8003 | 986 | 1515 | 9.9 | 14999 | ◯ |
| 36 | O | 1.13 | 1 | 350 | 389 | 239 | 1.1 | 7851 | 1023 | 1624 | 10.0 | 16240 | ◯ |
| 37 | O | 1.13 | 1 | 350 | 389 | 239 | 5.6 | 7647 | 1029 | 1686 | 9.7 | 16354 | ◯ |
| 38 | P | 1.14 | 1 | 350 | 387 | 237 | 0.8 | 8025 | 923 | 1480 | 10.6 | 15690 | ◯ |
| 39 | Q | 1.14 | 1 | 350 | 383 | 233 | 0.8 | 7960 | 974 | 1500 | 10.5 | 15753 | ◯ |
| 40 | R | 1.12 | 1 | 350 | 382 | 232 | 0.8 | 7952 | 921 | 1496 | 10.1 | 15112 | ◯ |
| 41 | S | 1.13 | 1 | 350 | 386 | 236 | 0.3 | 8252 | 934 | 1346 | 9.0 | 12110 | ◯ |
| 42 | S | 1.13 | 1 | 350 | 386 | 236 | 0.4 | 8190 | 939 | 1432 | 8.7 | 12457 | ◯ |
| 43 | S | 1.13 | 1 | 350 | 386 | 236 | 0.8 | 8013 | 875 | 1549 | 10.1 | 15643 | ◯ |
| 44 | S | 1.13 | 1 | 350 | 386 | 236 | 2.2 | 7804 | 943 | 1630 | 9.3 | 15158 | ◯ |
| 45 | S | 1.13 | 1 | 350 | 386 | 236 | 5.6 | 7601 | 974 | 1672 | 9.8 | 16303 | ◯ |
| 46 | S | 1.13 | 1 | 350 | 386 | 236 | 19.0 | 7335 | 1106 | 1709 | 9.9 | 16836 | ◯ |
| 47 | T | 1.14 | 1 | 350 | 397 | 247 | 0.3 | 8433 | 962 | 1342 | 9.0 | 12081 | ◯ |
| 48 | T | 1.14 | 1 | 350 | 397 | 247 | 0.4 | 8369 | 985 | 1348 | 9.5 | 12805 | ◯ |
| 49 | T | 1.14 | 1 | 350 | 397 | 247 | 2.2 | 7970 | 976 | 1535 | 9.0 | 13816 | ◯ |
| 50 | T | 1.14 | 1 | 350 | 397 | 247 | 5.6 | 7767 | 982 | 1578 | 9.0 | 14201 | ◯ |
| 51 | T | 1.14 | 1 | 350 | 397 | 247 | 19.0 | 7495 | 1064 | 1615 | 9.9 | 15985 | ◯ |

Each test was performed at a heating temperature of 900° C. and a forming start temperature of 800° C. to 700° C.
Each test was performed at an average rate of temperature rise of about 10° C./s in the range from 100° C. up to the heating temperature Tables 1 to 3 demonstrate as follows.

Test Nos. 1 to 4 each had an insufficient Si content and failed to have excellent strength-ductility balance. The data of Test Nos. 2 and 3 demonstrate that the samples, when having an insufficient Si content, fail to have sufficiently high strength-ductility balance even at different average cooling rates in the range from [(Ms temperature)−150° C.] down to 80° C. Test No. 4 had a parameter λ greater than the specific range and had remarkably poor strength-ductility balance.

Test Nos. 5 to 7 underwent cooling from [(Ms temperature)−150° C.] down to 80° C. performed so that the parameter λ is greater than the specific range and had poor strength-ductility balance.

Test Nos. 8 and 9 underwent cooling from [(Ms temperature)−150° C.] down to 80° C. performed so that the parameter λ is less than the specific range and gave a steel member with poor productivity.

Test Nos. 41, 42, 47, and 48 underwent cooling from [(Ms temperature)−150° C.] down to 80° C. performed so that the parameter λ is greater than the specific range and had poor strength-ductility balance.

In contrast, Test Nos. 10 to 40, 43 to 46, and 49 to 51 employed steel sheets having chemical compositions as specified in the present invention, underwent the method for manufacturing steel member as specified in the present invention, and gave steel members that had high strengths and excellent strength-ductility balance with good productivity.

Among them, Test Nos. 10 to 14 employed an identical blank, but underwent cooling from [(Ms temperature)−150° C.] down to 80° C. at different parameters λ. The resulting steel members each had good strength-ductility balance.

Test Nos. 15 to 18 employed an identical blank, but underwent press forming in different numbers of operations at different final tool release temperatures. A comparison among data of these tests demonstrates that the resulting steel member can have productivity and strength-ductility balance both at high levels by performing multistage forming at a low final tool release temperature.

Experimental Example 2

In Experimental Example 2, sample steel sheets were heated up to the heating temperature, and how the average rate of temperature rise from 100° C. up to the heating temperature affects the properties of resulting steel members was examined.

In Experimental Example 2, each sample was prepared as a small-sized flat sheet having a thickness of 1.4 mm, a width of 180 mm, and a length of 50 mm, subjected to a heat treatment using electric heating equipment, and evaluated.

The steel sheet of Blank "A" in Table 1 was heated up to a heating temperature of 900° C. In this process, the steel sheet was heated from 100° C. up to the heating temperature at different average rates of temperature rise as given in Table 4 below. At the time point when the sample temperature reached the heating temperature of 900° C., the power supply was stopped, the sample was naturally cooled down to 800° C., further cooled so that the average cooling rate from the heating temperature (900° C.) down to [(Ms temperature)−150° C.] is about 10° C./s, further cooled from [(Ms temperature)−150° C.] down to 80° C. so that the tempering parameter (λ) is a value given in Table 4, and thereby yielded a heat-treated sample. Other conditions than those mentioned above were as with Test No. 15 in Table 2.

A JIS No. 5 test specimen was sampled from the resulting heat-treated sample and subjected to a tensile test to determine YS, TS, EL, and TS×EL. Results of these are indicated in Table 4.

TABLE 4

| Test number | Average rate of temperature rise [° C./s] | Tempering parameter (λ) | YS [MPa] | TS [MPa] | EL [%] | TS × EL [MPa · %] |
|---|---|---|---|---|---|---|
| 52 | 4 | 8005 | 901 | 1467 | 9.3 | 13645 |
| 53 | 7 | 7891 | 954 | 1495 | 9.2 | 13754 |

TABLE 4-continued

| Test number | Average rate of temperature rise [° C./s] | Tempering parameter (λ) | YS [MPa] | TS [MPa] | EL [%] | TS × EL [MPa · %] |
|---|---|---|---|---|---|---|
| 54 | 50 | 8001 | 948 | 1550 | 9.1 | 14105 |
| 55 | 100 | 7998 | 950 | 1559 | 9.0 | 14031 |

Each test employed Blank "A".
Each test was performed at a heating temperature of 900° C. and a cooling start temperature (corresponding to forming start temperature) of 800° C.
Each test was performed at an average cooling rate of about 10° C./s in the range from the heating temperature down to [(Ms temperature) − 150° C.].

Table 4 demonstrates as follows. The steel sheet can have higher TS×EL balance by heating the steel sheet up to the heating temperature at a higher average rate of temperature rise in the temperature range from 100° C. up to the heating temperature. In particular, the heating is preferably performed at an average rate of temperature rise of 50° C./s or more so as to allow the steel sheet to have good TS×EL balance of 14000 MPa·% or more.

Experimental Example 3

In Experimental Example 3, steel sheets were prepared by hot press forming and subjected to tempering. In this process, how the tempering temperature affects the mechanical properties was investigated.

Steel members were prepared by the procedure of Test No. 16 (final tool release temperature: 380° C.) in Table 2 in Experimental Example 1, except that steel members prepared by hot press forming were further subjected to tempering as described below. The tempering was performed so that the steel members after hot press forming were each heated up to a tempering temperature given in Table 5 at an average rate of temperature rise of 40° C./s, and water-cooled without being held at the tempering temperature.

The resulting steel members were subjected to tensile tests by the procedure of Experimental Example 1 to determine YS, TS, EL, and TS×EL. Results of these are indicated in Table 5. Each test sample had in-tool holding time of shorter than 10 seconds in the hot press forming process and had good productivity (○).

TABLE 5

| Test number | Tempering temperature [° C.] | Tempering parameter (λ) | YS [MPa] | TS [MPa] | EL [%] | TS × EL [MPa · %] |
|---|---|---|---|---|---|---|
| 58 | 100 | 7930 | 944 | 1576 | 10.0 | 15760 |
| 59 | 200 | 7930 | 895 | 1535 | 10.0 | 15276 |
| 60 | 300 | 7930 | 974 | 1520 | 10.5 | 15964 |
| 61 | 400 | 7930 | 1160 | 1487 | 10.4 | 15466 |
| 62 | 500 | 7930 | 842 | 1030 | 13.6 | 14005 |
| 63 | 600 | 7930 | 745 | 993 | 14.6 | 14492 |

Each test employed Blank "A".
Each test was performed at an average rate of temperature rise of about 10° C./s in the range from 100° C. up to the heating temperature.
Each test was performed at a heating temperature of 900° C. and a forming start temperature of 800° C. to 700° C.
Each test was performed at an average cooling rate of about 10° C./s in the range from the heating temperature down to [(Ms temperature) − 150° C.].

Table 5 demonstrates as follows. A comparison of Test No. 58 with Test Nos. 59 to 62 demonstrates that the samples, even when further subjected to tempering, can be controlled in strength without having inferior TS×EL balance. The data of Test No. 63 demonstrate that tempering is preferably performed at a tempering temperature of lower than 600° C. in terms of upper limit so as to provide a desired yield strength (800 MPa or more).

REFERENCE SIGNS LIST

1 punch
2 die
3 leading pad
4 steel sheet (blank)
5 pin
6 part
7 reinforcer

The invention claimed is:

1. A method for manufacturing a hot press formed steel member, the method comprising heating a steel sheet and subjecting the steel sheet to at least one time of hot press forming, the steel sheet comprising, as a chemical composition in mass percent,
C in a content of 0.15% to 0.4%;
Si in a content of greater than 1.0% to 1.65%;
Al in a content of 0.5% or less, excluding 0%;
Mn in a content of 1% to 3.5%;
Ti in a content of 0.10% or less, excluding 0%;
B in a content of 0.005% or less, excluding 0%; and
iron,
wherein:
a heating temperature is equal to or higher than $Ac_3$ transformation temperature,
a starting temperature of the hot press forming is in a range from the heating temperature to a martensite start (Ms) temperature, and
cooling from [(Ms temperature)−150° C.] down to 80° C. is performed so that a tempering parameter (λ) as specified by Expression (1) is in a range from 7100 to 8030:

$$\lambda = 293 \times \left\{ \log\left(\frac{\sum_{n=1}^{5000} t'_n}{3600}\right) + 20 \right\} - 430 \times [Si] \quad (1)$$

where λ represents the tempering parameter; [Si] represents the content, in mass percent, of Si in the steel; and $t_n'$ represents a value as specified by Expression (2):

$$t'_n = 3600 \times 10^{\wedge}\left\{ \frac{T_{n-1} + 273}{293} \times \left(\log\frac{t_n - t_{n-1}}{3600} + 20\right) - 20 \right\} \quad (2)$$

where $t_n$ represents an n-th time, in seconds, when a total cooling time from [(Ms temperature)−150° C.] down to 80° C. is divided into 5000 equal parts; $T_n$ represents a temperature (° C.) at the n-th time $t_n$, where $t_0$ is 0 second, and $T_0$ is [(Ms temperature)−150° C.]; and 10^{ } represents { }-th power of 10.

2. The manufacturing method according to claim 1, wherein the cooling from [(Ms temperature)−150° C.] down to 80° C. is performed at an average cooling rate of 5° C./s to 20° C./s.

3. The manufacturing method according to claim 1, wherein a finishing temperature of final hot press forming in the at least one time of hot press forming is equal to or lower than the Ms temperature.

4. The manufacturing method according to claim 1, wherein the heating of the steel sheet up to the heating temperature is performed at an average rate of temperature rise of 5° C./s or more in a temperature range from 100° C. up to the heating temperature.

5. The manufacturing method according to claim 1, comprising
tempering at a temperature from 100° C. to lower than 600° C. after the hot press forming.

6. The manufacturing method according to claim 1,
wherein the steel sheet further comprises, in the chemical composition, at least one element selected from the group consisting of:
(a) Cr in a content of 5% or less, excluding 0%;
(b) at least one element selected from the group consisting of Ni and Cu in a total content of 0.5% or less, excluding 0%;
(c) Mo in a content of 1% or less, excluding 0%; and
(d) Nb in a content of 0.1% or less, excluding 0%.

* * * * *